UNITED STATES PATENT OFFICE.

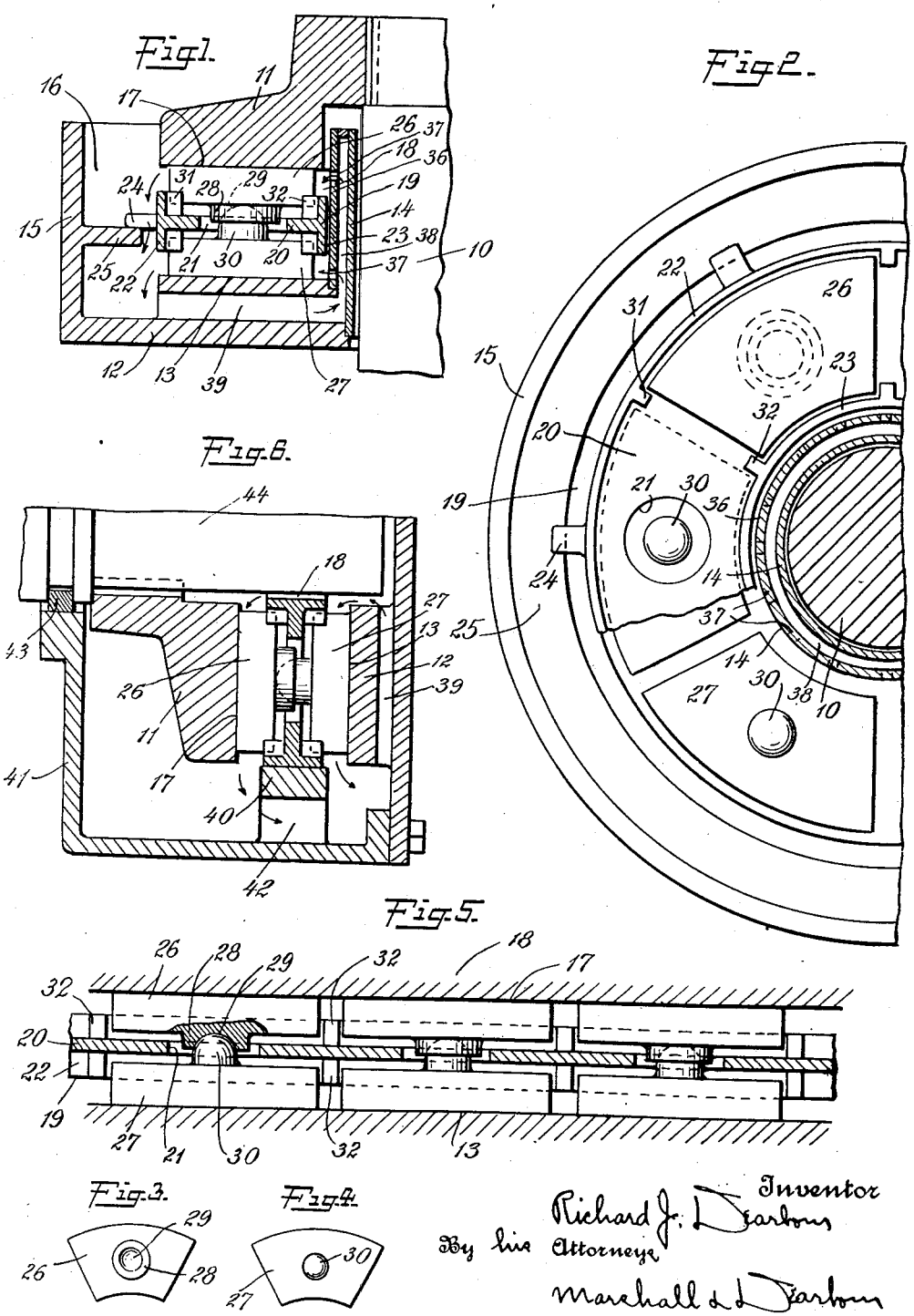

RICHARD J. DEARBORN, OF PLANDOME, NEW YORK, ASSIGNOR TO ALBERT KINGSBURY, OF PITTSBURGH, PENNSYLVANIA.

BEARING.

1,412,341. Specification of Letters Patent. Patented Apr. 11, 1922.

Application filed November 13, 1917. Serial No. 201,762.

*To all whom it may concern:*

Be it known that I, RICHARD J. DEARBORN, a citizen of the United States of America, and a resident of Plandome, Nassau County, and State of New York, have invented certain new and useful Improvements in Bearings, of which the following is a specification, reference being had to the accompanying drawings, forming a part thereof.

My invention relates to bearings, and particularly to thrust bearings of the general type disclosed in Kingsbury Patents Nos. 947,242, 1,117,499, etc., and it has for one object to provide a simple and durable bearing structure which comprises rotatable, interengaging or interconnected sets of shoes mounted to tilt both radially and circumferentially with respect to the axis of the bearing.

Another object of my invention is to provide a bearing which comprises a floating structure employing a plurality of sets of interconnected or interengaging tiltably-mounted shoes, the shoes of each set being mounted to tilt both radially and circumferentially with respect to the axis of the bearing and independently of the shoes of the other set.

Another object of my invention is to provide a floating bearing member comprising a shoe cage and bearing shoes arranged in pairs, with the shoes of each pair mounted back to back in inter-engaging tiltable relation.

In order that my invention may be thoroughly understood I will now proceed to describe the same in the following specification, by reference to two embodiments thereof, and then point out the novel features thereof in appended claims. The invention, however, is capable of receiving a variety of mechanical expressions, only two of which are shown on the accompanying drawings, and it is to be expressly understood that the drawings are for purposes of illustration only and are not to be construed as a definition of the limits of the invention, reference being had to the appended claims for that purpose.

Referring to the drawings:

Figure 1 is a partially sectional elevation of a thrust bearing arranged and constructed in accordance with my invention and constituting an embodiment thereof.

A partial plan view of the same bearing is shown in Figure 2.

Figures 3 and 4 show respectively a bottom plan view of one of the shoes in the top row and a top plan view of one of the cooperating shoes in the bottom row.

Figure 5 shows a partially sectional elevation of the shoes developed into a single plane.

Figure 6 is a view, corresponding to Figure 1, of a horizontal shaft bearing which constitutes an embodiment of my invention.

Referring first to Figures 1 to 5 inclusive: 10 designates a shaft to which the thrust block 11 is affixed. In the form shown, the shaft extends through a suitable opening in a base 12 which is provided with a thrust bearing surface 13. Said base also carries a sleeve 14 which loosely surrounds the shaft 10 and an outer annular wall or flange 15 which cooperates with the sleeve 14 in forming an annular oil chamber 16. The thrust block 11 has an annular bearing surface 17 which is opposed to the bearing surface 13.

Within the chamber 16 and spaced at a short distance from the sleeve 14 is an annular plate 36 which is perforated at 37 opposite the bearing surfaces and is shown as joined to the sleeve 14 at the top, the parts being so arranged that an annular oil passage 38 is formed. The base 12 has radial apertures constituting oil passages 39 which connect the outer part of the oil chamber 16 with the annular oil passage 38.

Between the surfaces 13 and 17 is interposed a bearing structure 18 with which my invention is particularly concerned. In the form shown, this structure comprises a cage 19 having a web 20 in which are a plurality of spaced holes 21, and on which are flanges 22 and 23. Extending outwardly beyond the flange 22 are a plurality of lugs 24 which are adapted to rest on a ledge or shelf 25 having the form of an annular projection from the outer wall 15 of the base.

The bearing member 18 in addition to the cage 19 comprises a plurality of bearing shoes 26 and 27 which are arranged in pairs as clearly shown in Figures 1 and 5. Each pair of shoes is like the others and it is only necessary to describe one. Each shoe 26, as shown in Figure 3, has a lug or projection 28 having a spherical recess 29 formed therein and each shoe 27 (see Fig.

4) has a spherical projection or lug 30 which is adapted to fit into the recess 29 so that each shoe is tiltably mounted on the other shoe of the pair.

The cooperating projections extend through the holes 21 in the cage and space the shoes from each other and from the cage.

The shoes are held loosely between the flanges 22 and 23 of the cage, and, furthermore, the cage is provided with axially extending lugs 31 and 32 which fit loosely between the shoes at the corners and prevent them from having any substantial transverse movement independently of the cage. They also keep the shoes in their proper relative positions.

When the bearing is in operation, the shoes are adapted to tilt freely with reference to each other in circumferential or tangential directions relatively to the axis of the bearing, so as to assume relatively angular positions for maintaining automatic lubrication between the bearing surfaces of the shoes and the adjacent annular bearing surfaces 13 and 17 with which they cooperate. Each shoe is also free to tilt in radial directions relatively to the axis of the bearing with respect to its associated mate and with respect to the bearing surface with which it cooperates so as to maintain uniformity of bearing engagement over the entire width of the bearing members, even when one or both of those members become unequally heated at their inner and outer zones and assume the form of a frusto-conical surface of low altitude, or become "crowned" as it is sometimes termed. At the same time the bearing member 18 as a whole is free to rotate about the axis of the shaft, and consequently if it is assumed for example that the shaft is rotating at 1000 revolutions per minute and that the base is stationary, the member 18 will rotate at approximately 500 revolutions per minute so that the speed difference at each of the bearing surfaces 13 and 17 corresponds to a speed of 500 instead of a speed of 1000 revolutions per minute. The advantages of such an arrangement are apparent and evidently the bearing is particularly well adapted for use with members rotating at high speed.

In order that the bearing surfaces may be automatically lubricated, it is necessary to supply the spaces between the shoes with oil. This may be accomplished in any suitable way, but if the chamber 16 is filled sufficiently to flood the upper bearing surface 17 this result will be obtained in the structure illustrated. When the bearing is in operation the rotation of the bearing member 18 tends to throw the oil radially outward, but more oil is supplied through the passages 39, 38 and 37 with the result that a circulation of oil is established. This prevents local heating of the oil and in fact tends to reduce the temperature of the body of oil.

In Figure 6 my invention is shown embodied in a bearing for a horizontal shaft, like parts being designated by the same reference characters as in the previous figures. 44 is a substantially horizontal shaft to which the thrust block 11 is attached and 41 a housing or lubricant receptacle having the base or thrust member 12 formed on or attached to it. Said housing 41 is shown as closely surrounding the shaft adjacent the thrust block 11 and may be provided at this point with a packing ring 43 to close the oil chamber formed within the housing.

In the form shown, the shoe cage 20 which holds the shoes 26 and 27 in place is rotatively mounted in a bearing member or partition 40 having one or more axial passages 42 therein to provide for circulation of the oil, said circulation being substantially as indicated by the arrows in Figure 6. The oil is thrown radially outward by centrifugal action and returns through the passages 39 to the annular space or passage surrounding the shaft at the inner side of the bearing member, whence it again flows to the bearing surfaces.

The shoes may be formed and mounted in interengaging or interconnected pairs in a variety of ways, to provide for a tilting movement between the same, without departing from the spirit of my invention. Reference is therefore to be had to the appended claims for a definition of the limits of the invention.

What I claim is:

1. A bearing comprising opposed thrust surfaces and an interposed movable bearing structure comprising a pair of bearing shoes each of which is tiltably mounted on the other and has a thrust surface in engagement with one of said first-named surfaces.

2. A bearing comprising opposed bearing surfaces, an interposed movable bearing structure comprising a plurality of bearing shoes arranged in intergaging pairs with their respective bearing surfaces in engagement with said first-named bearing surfaces, and means for maintaining the pairs of shoes in a predetermined relation.

3. A bearing comprising opposed bearing surfaces, an interposed movable bearing structure comprising a plurality of bearing shoes arranged in pairs, and means for maintaining the pairs of shoes in a predetermined relation, the shoes of each pair being tiltably mounted the one on the other.

4. A bearing comprising opposed bearing surfaces, an interposed movable bearing structure comprising a plurality of bearing shoes arranged in intergaging pairs, and a rotatable annular cage for maintaining the pairs of shoes in position without interfering with their tilting in operation.

5. A bearing comprising opposed bearing surfaces, an interposed movable bearing structure comprising a plurality of bearing shoes arranged in pairs, and a rotatively mounted perforated annular cage, said shoes having cooperating projections which extend through the perforations of the cage.

6. A bearing comprising opposed thrust bearing surfaces and an interposed movable bearing structure comprising a rotatable cage having spaced holes therethrough and a plurality of bearing shoes having cooperating projections and arranged in pairs with the projections extending through the holes in the cage, the shoes of each pair being tiltably mounted the one on the other.

7. A bearing comprising opposed thrust surfaces and an interposed movable bearing structure comprising a pair of bearing shoes each of which is mounted on the other to tilt both radially and circumferentially with respect to the axis of the bearing.

8. A bearing comprising opposed bearing surfaces and an interposed movable bearing structure comprising a pair of interengaging bearing shoes pivotally mounted for tilting movement with respect to each other.

9. A bearing comprising opposed bearing surfaces and an interposed movable bearing structure comprising a pair of interconnected bearing shoes pivotally mounted to tilt with respect to each other both radially and circumferentially with respect to the axis of the bearing.

10. A bearing comprising opposed bearing surfaces and an interposed movable bearing structure comprising two sets of bearing shoes engaging the respective bearing surfaces and interengaged in pairs to tilt independently.

11. A bearing comprising opposed bearing surfaces and an interposed movable bearing structure comprising two sets of bearing shoes engaging the respective bearing surfaces and interengaged in pairs to tilt independently both radially and circumferentially with respect to the axis of the bearing.

12. A bearing comprising opposed thrust surfaces and an interposed movable bearing structure comprising two sets of bearing shoes engaging the respective thrust surfaces and interengaged in pairs to tilt independently with respect to each other.

13. A bearing comprising opposed thrust surfaces and an interposed movable bearing structure comprising two sets of bearing shoes engaging the respective thrust surfaces and interengaged in pairs to tilt independently with respect to each other both radially and circumferentially with respect to the axis of the bearing.

14. A bearing comprising opposed thrust surfaces and an interposed movable bearing structure comprising a pair of bearing shoes interengaged to tilt with respect to each other.

15. A bearing comprising opposed bearing surfaces and an interposed movable bearing structure comprising a pair of bearing shoes one of which is provided with a spherical recess and the other of which is provided with a spherical projection engaged in said recess.

16. A bearing comprising opposed thrust surfaces and an interposed movable bearing structure comprising a pair of bearing shoes interconnected to tilt with respect to each other both radially and circumferentially with respect to the axis of the bearing.

17. A thrust bearing comprising relatively rotatable bearing members having opposed bearing surfaces, an interposed movable bearing member, and means for rotatively supporting the interposed bearing member at its outer periphery.

18. A thrust bearing comprising relatively rotatable bearing members having opposed bearing surfaces, an interposed movable bearing member, and a stationary cylindrical outer bearing for the interposed bearing member having axial oil passages therethrough.

19. The combination with a horizontal thrust bearing, of a receptacle for the lubricant located below said bearing, and a partition adapted to separate the periphery of said bearing from said receptacle, the inner side of said bearing being in open oil-admitting communication with said receptacle.

20. The combination with a horizontal thrust bearing, of a receptacle for the lubricant located below said bearing, the periphery of said bearing being separated from the said receptacle, while the inner side of said bearing is in open oil-admitting communication with the receptacle through passages.

21. The combination with a horizontal thrust bearing, of a receptacle for the lubricant, a partition located between and adapted to separate the periphery of said bearing from said receptacle, and oil-inlet passages adapted to communicate the inner side of said bearing with the receptacle.

22. The combination with a horizontal thrust bearing, of a receptacle for the lubricant, a partition adjacent the periphery of said bearing and between the same and said receptacle, and oil-inlet passages between said receptacle and the inner side of said bearing.

In witness whereof, I have hereunto set my hand this 12th day of November, 1917.

RICHARD J. DEARBORN.